(12) United States Patent
Seefried et al.

(10) Patent No.: US 6,263,739 B1
(45) Date of Patent: Jul. 24, 2001

(54) PLASTIC MEMBRANE PRESSURE SENSOR FOR THE SEMICONDUCTOR INDUSTRY

(75) Inventors: Thorsten Seefried, Klingenberg; Joachim Gareus, Weilbach; Udo Hörning, Eichenbühl, all of (DE)

(73) Assignee: Wika Alexander Wiegand GmbH & Co., Klingenberg/Main (DE)

( * ) Notice: Subject to any disclaimer, the term of this patent is extended or adjusted under 35 U.S.C. 154(b) by 0 days.

(21) Appl. No.: 09/469,566

(22) Filed: Dec. 22, 1999

(30) Foreign Application Priority Data

Dec. 22, 1998 (DE) .............................. 198 59 507

(51) Int. Cl.$^7$ ...................................... G01L 7/08
(52) U.S. Cl. ............................................ 73/715
(58) Field of Search .......................... 73/715, 756, 754, 73/706, 700; 181/167, 161, 169, 170–173; 428/316.6, 317.9, 319.3

(56) References Cited

U.S. PATENT DOCUMENTS

| 3,899,766 | * | 8/1975 | Mermelstein | 338/42 |
| 4,768,382 | | 9/1988 | Varrese . | |
| 5,652,391 | * | 7/1997 | Kingsford et al. | 73/706 |

FOREIGN PATENT DOCUMENTS

| 3121 799 A1 | 12/1982 | (DE) . |
| 42 31 823 A1 | 3/1994 | (DE) . |
| 42 35 684 A1 | 4/1994 | (DE) . |
| 0607482 A1 | 7/1994 | (EP) . |

\* cited by examiner

Primary Examiner—Benjamin R. Fuller
Assistant Examiner—Abdullahi Aw-Musse
(74) Attorney, Agent, or Firm—Roth & Goldman

(57) ABSTRACT

A membrane pressure sensor has a hollow space formed between a housing (1) and a cover (2), which is subdivided by two membranes (6; 61, 62) parallel to each other into a pressure sensing space (24) for impingement with a fluid with a pressure to be measured, into an air evacuation space between the membranes (6; 61, 62), and into a measurement fluid filled pressure output space (13) to forward the pressure to a pressure measurement arrangement (10), wherein the membranes (6; 61, 62) are made of a perfluoroalkoxy copolymer (PFA) and are designed shaped and congruent with the interposition of a plastic fiber insert (63). In this pressure sensor, the membrane (61) on the pressure sensing side is in direct contact with the cover (2), and an O-ring (3) is provided to seal the air evacuation space between the housing (1) and the cover (2). The housing (1) and cover (2) are made of a fluoropolymer. The pressure sensor is particularly suited for processes in which the entry a foreign metal ions into the test substance must absolutely be avoided.

18 Claims, 3 Drawing Sheets

PLASTIC MEMBRANE PRESSURE SENSOR FOR THE SEMICONDUCTOR INDUSTRY

Figure 1:
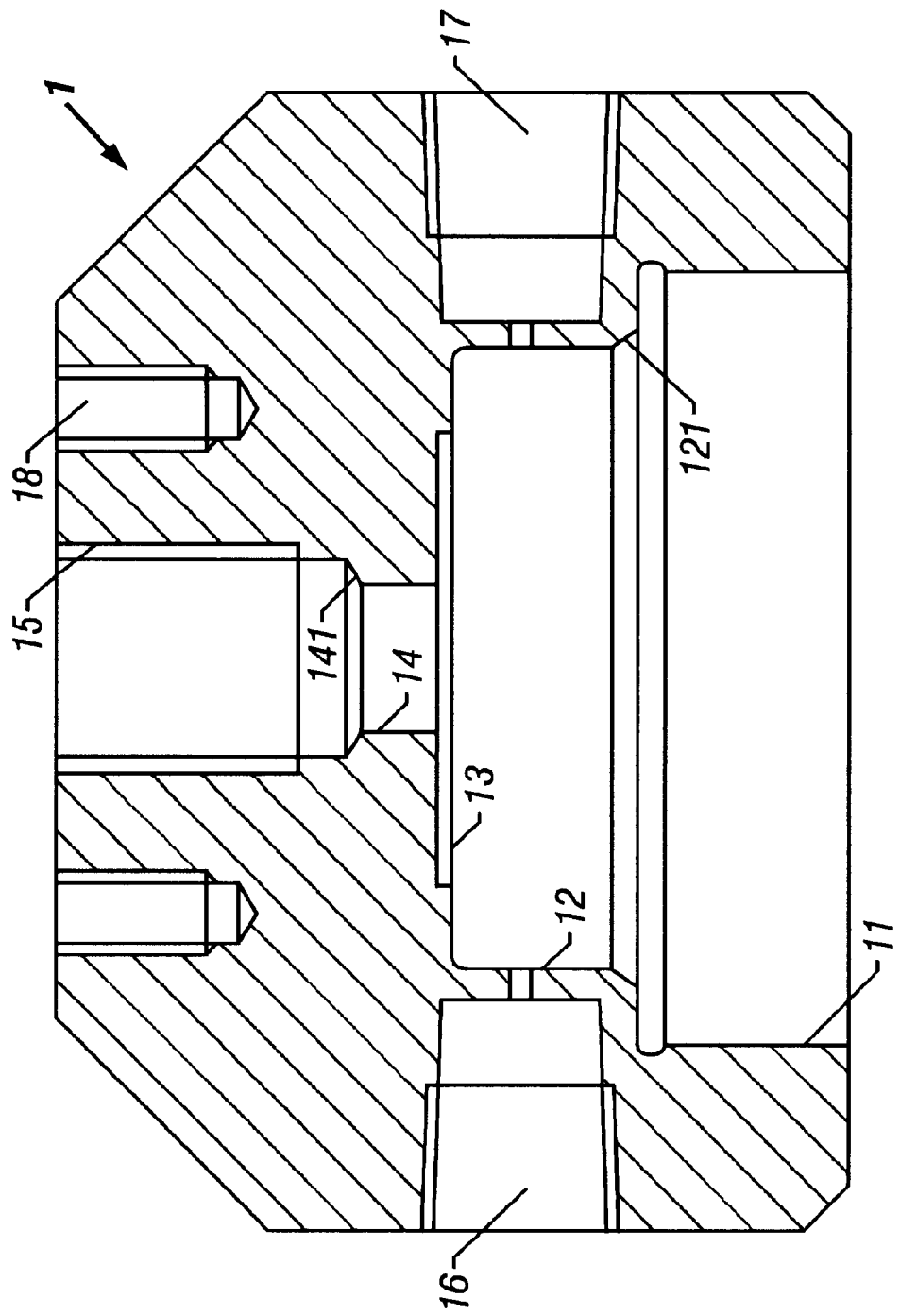

The invention concerns a membrane pressure sensor according to the generic portion of claim 1.

A membrane pressure sensor is used to transfer a pressure of a test substance to be measured to a pressure measurement device when the latter should not come directly into contact with the substance to be measured for specific reasons.

A prior art membrane pressure sensor has, in principle, two spaces or chambers separated from each other by a membrane, one of which is designed to accept the test substance and which can be impinged upon by the pressure of the test substance. The other chamber on the other side of the membrane is filled with a filling fluid and is connected to a pressure measurement arrangement. A pressure exerted on the test substance is transferred to the fluid by a corresponding deviation of membrane such that the pressure in the test substance can be detected without the test substance coming directly into contact with pressure measurement arrangement.

To guard against rupture of the membrane and ensure monitoring of its condition, it is further known to use a two-layer membrane, i.e., two substantially parallel membranes, whereby the space between them forms an air evacuation space.

Prior art membrane pressure sensors are usually made of metal or metal alloys with corresponding corrosion resistance. Usually, elastic membranes are used whose working volume, i.e., the volume displaced by the displacement of the membrane, should be high. The reason for this, in particular in mechanical pressure measurement arrangements, is that for the deformation of a measurement element which is detected and displayed as the value representative of the pressure, a minimum working volume must always be displaced by the membrane and pushed into the pressure measurement arrangement. This is true in particular when the membrane pressure sensor is to be connected to the actual pressure measurement arrangement by a remote line which also has elasticity.

Metal membranes are also known, which, also to achieve a higher working volume, are designed with concentric waves, i.e., these membranes have a sine-wave shape in the radial cross-section.

In most cases, the problem in the choice of the appropriate materials for the membrane pressure sensor consists in that corrosion of the pressure sensor must be avoided. As a result, there are currently membrane pressure sensors made completely or partially of plastics for special applications.

These known pressure sensors made of plastic are only useful to limited extent for some special applications, in particular in the semiconductor industry, in plastics manufacture, or in the production of technical glass, since in these cases an introduction of foreign metal ions into the test substance, i.e., into the process media or materials must strictly be avoided in the aforementioned applications.

The known membrane pressure sensors made of plastic use elastomers for the membranes. However, metal ions, which contaminate the test substance, are leached out of these highly resistant elastomers, for example, vinylidene fluoride-hexafluoropropylene rubber (FKM). It has been proposed to coat these elastomer membranes with polytetrafluoroethylene (PTFE) to reduce the aforementioned leaching effect.

To prevent any leaching of metal ions from elastomers, a plastic pressure sensor is known which has a spherical-segment-shaped membrane made of solid polytetrafluoroethylene (PTFE). This membrane is, however, very stiff such that slight pressure changes can no longer be measured with reasonable accuracy. Besides that, the aforementioned material (PTFE) tends to wrinkle and, consequently, strong hysteretic phenomena distort the measurement result. Moreover, such a membrane has temperature responses which also distort the measurement result.

Plastic pressure sensors with a plate-shaped membrane are also made of perfluoroalkoxy copolymer (PFA), which because of the high stiffness of the membrane, have, however, only small working volume and poor response behavior.

These membrane pressure sensors made as single membranes also have the disadvantage that diffusion occurs through the membrane. Metal ions dissolved in the fluid, which come from the pressure measurement arrangement made at least partially of metal, can diffuse into the filling fluid and thus negatively affect the test substance. The diffusion effect is present with elastomers to a considerable extent.

To combat diffusion through the membrane, a pressure sensor of two spherical-segment-shaped membranes made of solid polytetrafluoroethylene (PTFE) arranged one behind the other is known. Between the membranes arranged with a large distance between them, an annular element, also made of solid polytetrafluoroethylene (PTFE), is also inserted between the membranes to transfer force. The membranes are sealed relative to their respective chambers by means of O-rings. The intermediate space formed by the two membranes is aerated such that diffusion is prevented. Moreover, with this system the double design of the membranes results in increased process safety, since the rupture of a membrane does not inevitably result in contamination of the process medium with metal ions.

This known pressure sensor has however the disadvantage that the double membrane is particularly stiff, has a pronounced flow behavior (hysteretic effects) because of the material, is subject to temperature influences, and also the weight of the annular element transferring the force greatly impairs the response behavior of the pressure sensor such that reasonable measurement accuracy cannot be obtained until the high pressure range (starting from approximately 2.5 bar). In addition, the chamber on the test substance side is sealed on the membrane on the test substance side by an elastomer seal (O-ring) such that leaching effects of metal ions from the elastomer also occur here and can contaminate the test substance.

Compared to this prior art, the object of the invention is to propose a membrane pressure sensor which permits high measurement accuracy at low pressures in test substances in which any contamination by foreign metal ions must be strictly avoided.

The object is accomplished with a membrane pressure sensor with the characteristics of claim 1.

According to the invention, the membrane pressure sensor has a hollow space formed between a housing and a cover which is subdivided by two membranes parallel to each other into a pressure sensing space or chamber for the impingement of a test substance with pressure to be measured, into an air evacuation space between the membranes, and into a pressure output space or chamber which can be filled with a fluid to forward the pressure to a pressure measurement arrangement, whereby the membranes are made of a perfluoroalkoxy copolymer (PFA) and are designed congruent with the interposition of a plastic fiber insert and with shaping. The pressure sensing side or test substance side of the membrane is in direct contact with the cover, and an O-ring is provided to seal the air evacuation space between the housing and cover. The housing and cover are made of a fluoropolymer.

Through the use according to the invention of shaped, e.g., waved, in particular concentrically waved perfluoroalkoxy copolymer (PFA) membranes, the positive material properties of the chemically neutral, metal-free, and heat formable PFA material can be used effectively in a membrane. Through the shaping of the membrane, it is advantageously deformable in the direction of its primary plane such that a large working volume may be achieved with low response pressures.

Because of the low E-modulus of plastics, their elastic deformation range is usually small. By means of the shaping, for example, in the form of sine-wave-shaped concentric corrugation, the material expansion required with flat membranes for their deflection is converted into a bending load at the points of curvature. With an appropriate number of a bends in the shaping, i.e., a comparatively great length of the membrane in the direction of the primary plane of the membrane, the elongation of the membrane upon deflection to a great length and low bending at the large number of the points of curvature are distributed such that the deformations remain slight in the membrane material despite a high working volume. Thus, the deformations of the membrane remain within the elastic range of the plastic used such that hysteretic effects are avoided.

Because of the heat formability of the PFA material, the membranes can preferably be hot stamped, i.e., pressed by an appropriate combination of heated female/male dies such that the membranes can remain permanently transformed into the predefined shaped. It is also possible to produce the membranes by extrusion; the selection of the appropriate process depends on the desired dimensions of the membranes, production quantities, etc.

To prevent diffusion through the membrane as well as to improve protection against contamination of the test substance in the event of membrane rupture, according to the invention, two wave-shaped membranes are provided congruently with the interposition of a plastic fiber layer. An area regulations space is formed between the two membranes. The plastic fiber layer prevents intimate contact of the two membranes such that the air evacuation space can always be flowed through by a liquid, while good pressure forwarding by the membranes, i.e., an exact parallel movement of the two membranes, is retained. The fiber layer provided between the membranes is very light and flexible such that the weight of the fiber layer as well as a possible anticipated stiffening effect from the intermediate layer have no influence on the response behavior of the pressure sensor.

By means of the air evacuation chamber, materials possibly diffused through the membranes may be removed before they reach the respective opposing membrane. Thus, an exchange of material between the pressure sensing chamber and pressure output chamber is reliably prevented. In addition, in the event of the rupture of one membrane, the second membrane is always still present as a barrier between the test substance and the filling fluid such that emergency protection against contamination of the test substance is provided.

In the pressure sensor according to invention, the membrane on the test substance side is in direct contact with the associated cover. Thus, it is possible to do without an elastic seal which is exposed to the test substance.

Preferably, an annular bead with a semicircular cross-section, for example, is formed on the cover such that a narrow contact surface for the membrane is formed. This yields a comparatively high surface pressure with a correspondingly improved seal. In addition, the annular bead serves as a support for the membrane which, because of the narrow contact surface, offers little resistance to the deflection of the membrane.

Elastomers present, as already discussed in the introduction, a leaching of metal ions. The direct arrangement according to the invention of the membrane on the cover ensures that no metal ions can enter the test substance through this connection point. An additional bonding of the membrane with the cover may optionally be carried out permanently by gluing or, in the case of a suitable pairing of materials, e.g., PFA membrane/PFA cover, by fusing. For this, heat sealing, cold sealing, or ultrasound processes may be considered.

For the case of rupture of one of the membranes, an O-ring which prevents an escape of fluid from the air evacuation space is provided to seal the cover relative to the housing to delimit the air evacuation space if one of the two membranes should break. Simultaneously, the O-ring prevents the entry of foreign materials into the test substance since it reliably prevents the penetration of dust or the like into the air evacuation chamber, whose contents could be washed into the test substance in the event of rupture of the membrane on the test substance side. Preferably, the O-ring is made of a material which itself releases no foreign metal ions.

Because of the chemical and thermal resistance, the cover is made according to the invention from a fluoropolymer with good compatibility for the material of the membranes (PFA). Although the housing bounds only the pressure output chamber, i.e., the filling fluid side and the air evacuation chamber, the housing according to the invention is also made of a fluoropolymer in case of the rupture of the membrane on the test substance side. In this case of membrane rupture, the test substance could otherwise come in contact with the housing and foreign metal ions could enter.

In the semiconductor industry and in the plastic industry, certain process materials are typical test substances such that in the following a few particularly preferred material combinations for the membrane pressure sensor are reported for these typical applications.

With the use of the membrane pressure sensor according the invention with highly concentrated acids to which the pressure sensing space is exposed, the fluoropolymer for the housing and the cover is selected from the group: perfluoroalkoxy copolymer (PFA), polytetrafluoroethylene (PTFE), and polyvinylidene fluoride (PVDF). In this case, the O-ring is made preferably of vinylidene fluoride-hexafluoropropylene rubber (FKM; trade name "Viton") coated with tetrafluoroethylene-hexafluoropropylene copolymer (FEP). This combination is particularly suitable for the cleaning of raw silicate chunks with highly concentrated acids (HF+HCl+$H_2O$) as process material (test substance).

With the use of the membrane pressure sensor according to the invention with highly purified water in the pressure sensing space, the fluoropolymer for the housing and the cover is selected from the group: perfluoroalkoxy copolymer (PFA), polytetrafluoroethylene (PTFE), and polyvinylidene fluoride (PVDF), whereby the O-ring is made of a material selected from the group: vinylidene fluoride-hexafluoropropylene rubber (FKM; trade name "Viton") coated with tetrafluoroethylene-hexafluoropropylene copolymer (FEP), tetrafluoroethylene-perfluoromethylvinyl ether copolymer (TFE-PMVE; trade name "Kalrez"), and polysilicone.

This material combination is particularly suitable for a floating process of crushed silicate grains, whereby the process material (test substance) is highly purified water.

With the use the membrane pressure sensor according to the invention in the presence of bases for alkaline hydrolysis in the pressure sensing chamber, the fluoropolymer for the housing and the cover is selected from the group: perfluoroalkoxy copolymer (PFA) and high-density high-grade polytetrafluoroethylene (PTFE), whereas the O-ring is made of material selected from the group: vinylidene fluoride-hexafluoropropylene rubber (FKM; trade name "Viton") coated with high-grade polytetrafluoroethylene (PTFE) and tetrafluoroethylene-perfluoromethylvinyl ether copolymer (TFE-PMVE; trade name "Kalrez").

In this case of alkaline hydrolysis, process materials and test substances mentioned are, in particular, NaOH and KOH; however, they may also be other bases.

With the use of the membrane pressure sensor according to the invention in the presence of mineral acids or transition metal acids for acid catalytic polymerization in the pressure sensing chamber, the fluoropolymer for the housing and the cover is selected from the group: perfluoroalkoxy copolymer (PFA) and high-density high-grade polytetrafluoroethylene (PTFE). A suitable O-ring is made of a material selected from the group: vinylidene fluoride-hexafluoropropylene rubber (FKM; trade name "Viton") coated with high-grade polytetrafluoroethylene (PTFE), tetrafluoroethylene-perfluoromethylvinyl ether copolymer (TFE-PMVE; trade name "Kalrez"), and polysilicone.

In the aforementioned cases, the plastic fiber insert is preferably made of polytetrafluoroethylene (PTFE). This can be a net, a woven fabric, or even a nonwoven fabric of these fibers.

An advantageous design embodiment of the pressure sensor according to the invention has a stepped hole passing through the housing. This through-hole forms, in this sequence, the following sections in the housing: a threaded section to accommodate the cover, a cover sealing section for sealing with an O-ring provided on the cover, a pressure output chamber section, a sealing section for sealing with an O-ring provided on the pressure measurement arrangement to be inserted, and a threaded section to accommodate the pressure measurement arrangement.

The cover has, for its part, on its periphery a threaded section to mate with the housing and has in its end facing the housing in the assembled position a recess, which is surrounded by an annular edge. The recess forms the pressure sensing chamber on the test substance side and is connected with an interface hole passing through the cover in the axial direction. The double membrane is attached with the annular edge, which can preferably be provided with a narrow annular bead, whereby only the membrane on the test substance side is directly and sealingly in contact with the cover. In the axial direction of the cover between the edge and the threaded section, a seating groove is formed to accommodate an O-ring opposite the cover sealing section.

In the housing, a pressure output chamber section is also formed on the filling fluid side which section is substantially flat or alternatively adapted to the shape of the membrane. By means of the shaped design of the chamber, it is possible to increase overpressure resistance with a shaped membrane. The chamber section has a substantially flat bearing section, running perpendicular to the axial direction of the through-hole, for an O-ring to seal the membrane on the filling fluid side. In the assembled position, the membrane is prestressed against the O-ring by the annular edge of the cover such that a seal forms due to axial pressure. In contrast thereto, the seal between the cover and a housing is made by an O-ring, which seals in the radial direction of the cover or housing. This seal is very reliable and independent of the tightening torque of the cover.

In the further course of the through-hole of the housing, a sealing section is formed for the pressure measurement arrangement to be inserted. The diameter of the sealing section is dimensioned such that the O-ring, which preferably is arranged in a groove on an extension of the pressure measurement arrangement, is pressed against the hole with a predefined surface pressure in the radial direction. Thus, a reliable seal of the pressure measurement arrangement is obtained, which is independent of the screwing depth or the tightening torque when the pressure measurement arrangement is screwed into the threaded section.

In particular, with the materials for the housing used according to the invention, flow of the materials may occur. Thus, it is possible with an axially active seal, whose pressing force depends on the tightening torque of the screws that the pressure measurement arrangement can work loose through flow of the very thin walled material in the region of the thread courses and the connection with an axial seal becomes leaky. In the present embodiment, the pressing force of the O-ring is applied in a region of high material thickness such that the flow of the housing material occurs to a substantially lower extent.

Additional advantageous embodiments are reported in the dependent claims.

Figure 2:
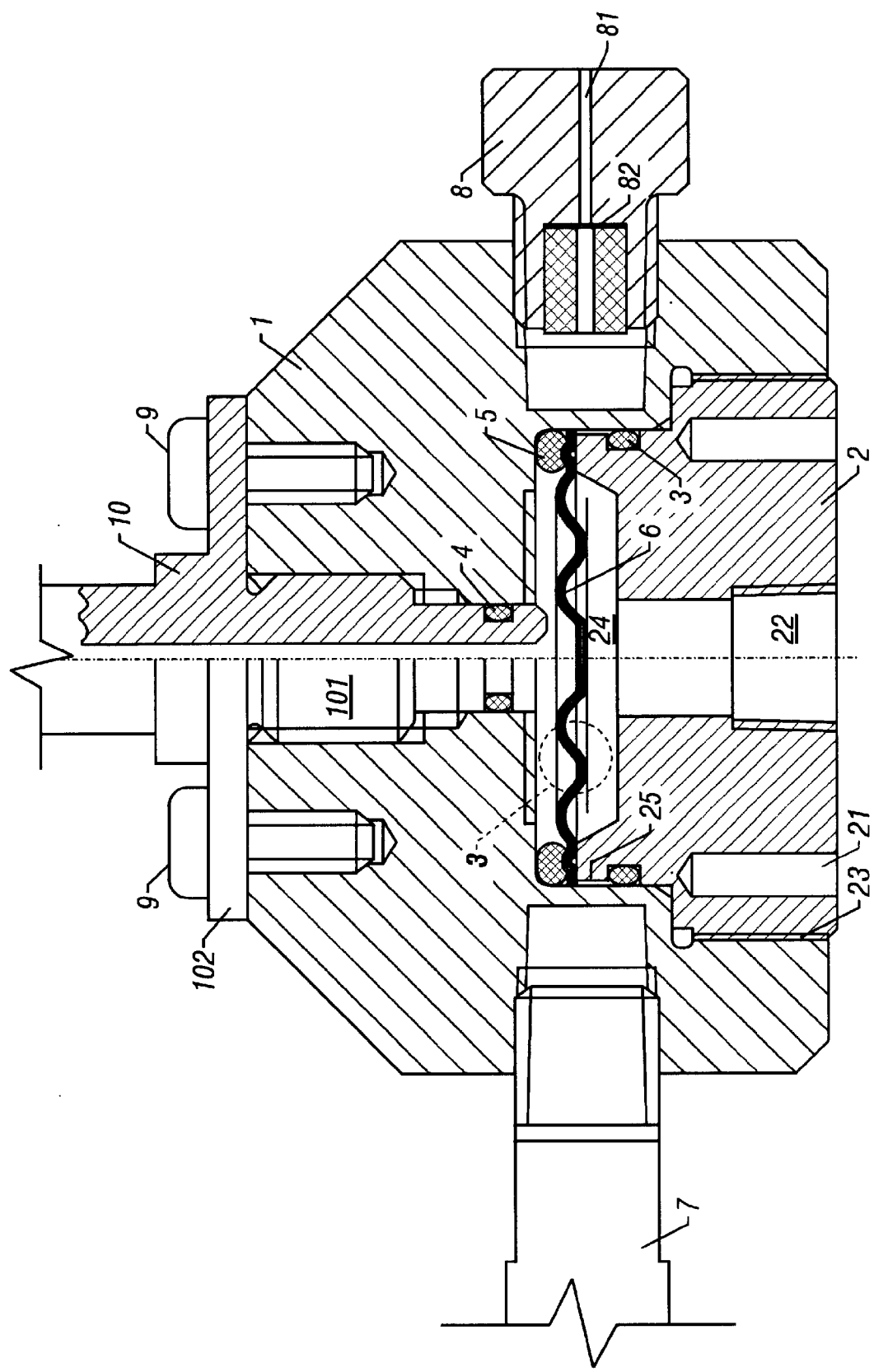
Figure 3:
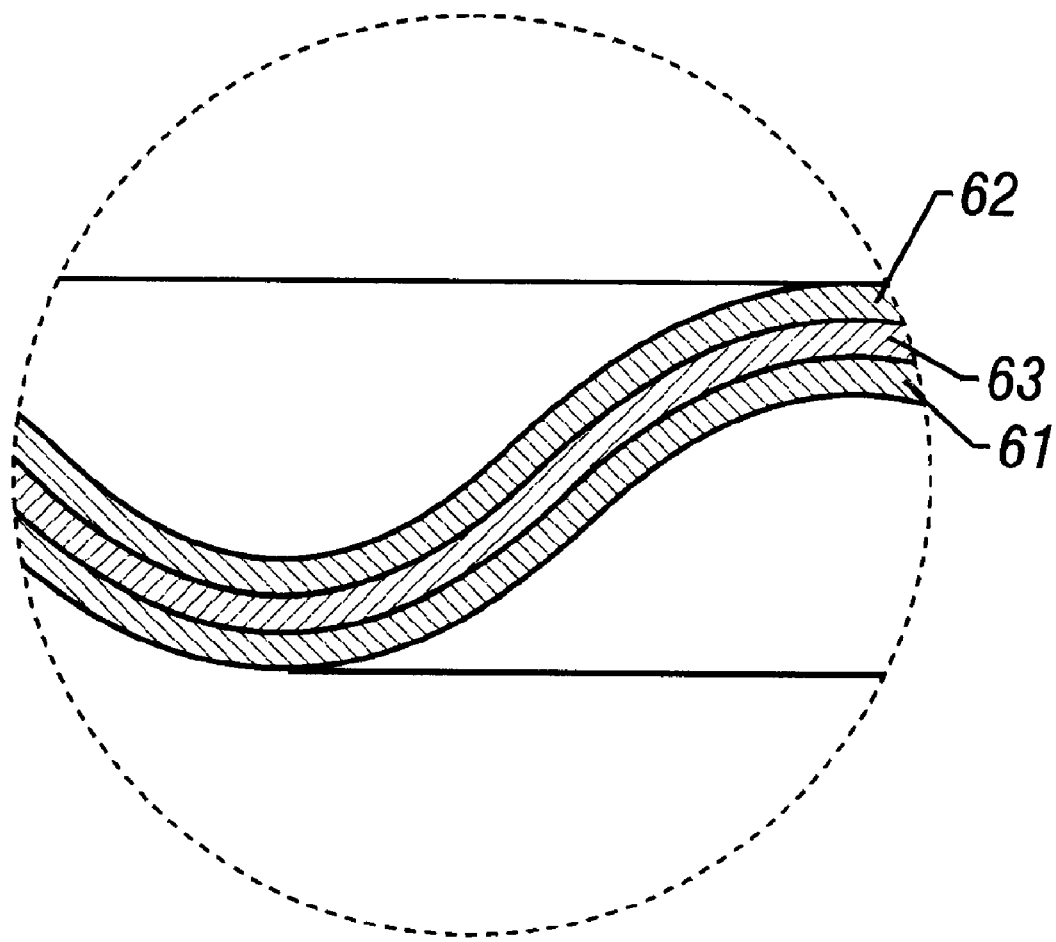

The invention is explained in detail in the following using a preferred exemplary embodiment with reference to the drawings. They depict:

FIG. 1 a cross-sectional view of a housing of one exemplary embodiment of a membrane pressure sensor according to the invention;

FIG. 2 a cross-sectional view of an assembled exemplary embodiment of a membrane pressure sensor according to the invention; and FIG. 3 an enlarged detail X of FIG. 2.

FIG. 1 depicts a housing 1 with a stepped through-hole passing through from the top to bottom. The through-hole has, considered from the bottom to the top in FIG. 1, a threaded section 11, followed by a cover sealing section 12 connected via a diagonal 121. Following the cover sealing section, a chamber section 13 is formed, followed by a sealing section 14. The sealing section 14 runs via a diagonal 141 into a connection threaded section 15. Air evacuation holes 16 and 17, each of which is provided with threads, are also made in the housing 1 at right angles to the through-hole. The housing 1 also has threaded holes 18 on the connection side face, which are designed as pocket holes.

FIG. 2 depicts an assembled exemplary embodiment of the membrane pressure sensor which is mounted on the housing 1 depicted in FIG. 1. In FIG. 2, a cover 2 is inserted into the housing 1 from the bottom. A cover thread 23 mates with the cover thread section 11 depicted in FIG. 1. The cover 2 has a connecting hole 22, which is provided with a conventional thread for connection to the process fixtures; however, other forms of connection, such as gluing, fusing, or the like, are also possible. The cover 2 also has a plurality of pocket holes 21, which enable screwing the cover on with a suitable tool. The cover 2 may also be provided with other appropriate means for screwing it on, e.g., outside hexes, etc.; however, this form of pocket holes provides greater protection against unintended loosening since a special tool (a stud driver) is required for this. Moreover, it is possible to obtain a flush connection of the cover 2 with the housing 1.

The cover 2 is sealed relative to the housing 1 with an O-ring 3, which is in contact with the cover sealing section 12 and is held in a seating groove. The cover 2 has in its housing 1 in the front in the assembled position a recess 24, which is surrounded by an annular edge 25. The recess 24 forms the pressure sensing chamber on the test substance side and is linked to the connecting hole 22. The double membrane 6 is affixed with the annular edge 25, whereby the membrane on the test substance side is directly and sealingly in contact with the cover 2.

To seal the connection point between the membrane 6 on the filling fluid side (pressure output side) and housing or to press the membrane 6 against the annular edge, an O-ring 5 is provided between the membrane 6 and the housing 1. The O-ring S is acted upon by the edge 25 of the cover 2 in the axial direction of the cover 2; it is clamped between the membrane 6 and the chamber section 13 on the filling fluid side. This O-ring 5 seals the pressure output chamber 13 (filling fluid side) against the air evacuation space, which is delimited between the O-rings 5 and 3 and the housing 1 and the cover 2.

The O-ring 5 is exposed only to the filling fluid such that its material cannot cause any metal ion entry into the test substance. The material of the O-ring 5 must, however, be selected such that it is resistant against the filling fluid and stable in the temperature ranges sought.

As is discernible in FIG. 2, the dimensions of the O-ring 5 and the chamber section 13 are selected such that the O-ring 5 is pressed against the wall of the housing 1 delimiting the chamber section 13 in the radial direction. This simplifies the assembly procedure since the O-ring 5 is thus always positioned to fit relative to the membrane 6 or the annular edge 25 of the cover 2.

As depicted in FIG. 1, the housing 1 is provided with two air evacuation holes 16 and 17, which extend at right angles to the through-hole in the housing 1 and open in the vicinity of the cover sealing section 12, between the O-ring 3 of cover 2 and the annular edge 25 of the cover 2.

The one air evacuation hole 17 is provided with an air evacuation plug 8, which is sealingly screwed into the hole 17. Preferably, the seal is provided by the thread itself, in that a sealing thread (NPT thread) is used. The plug 8 has a hole 81 passing through it, which is sealed by a porous PTFE membrane 82. The PTFE membrane 82 is gas permeable, but liquid impermeable. Thus, an equalization of a gas pressure in the air evacuation chamber can occur through the membrane 82 when the temperature to which the pressure sensor is exposed is raised or lowered, such that no disadvantageous influence on the measurement result is caused by a pressure change in the gas cushion between the membranes 6.

A sensor 7 is also sealingly screwed into the other air evacuation hole 16 (NPT thread) and is connected with the air evacuation space. The sensor 7 is a capacitive sensor, which can detect small quantities of fluid present in the air evacuation space, such that a rupture of one of the two membranes can be quickly detected by this sensor 7 from the escape of fluid.

In this connection, reference is made to FIG. 3, which depicts an enlarged detail of the double membrane 6. FIG. 3 depicts a first membrane 61, which, in the assembled position depicted in FIG. 2, forms the membrane on the test substance side, and a second membrane 62, which correspondingly forms the membrane on the filling fluid side. To prevent sealing contact of the two membranes, in particular in the clamped part of the membranes between the O-ring 5 and the edge 25 and to nevertheless enable a transfer of force to the membrane on the test substance side, a fiber layer 63 is inserted between the two membranes such that the air evacuation space between the membranes can always be flowed through by a fluid, while good pressure forwarding by the membranes, i.e., an exact parallel movement of the two membranes, is retained.

The fiber layer 63 arranged in the air evacuation space, which can be a net, a woven fabric, or even a nonwoven fabric, helps the the fluid escaping in the event of a membrane rupture to reach the sensor 7. Thus, a rapid response in the event of a membrane rupture is obtained. The fibers of the fiber layer 63 are usually made of high-purity PTFE, which is chemically inert and is exposed here to no high strength demands.

The fiber layer 63 supports the gas exchange with the surroundings through the air evacuation plug 8, since it prevents a sealing contact or adhesion of the membranes 61, 62 to each other.

Also discernible in FIG. 2 is a pressure measurement arrangement 10 used in the pressure sensor. The pressure measurement arrangement 10 has a fitting for use in the pressure sensor. The fitting has a groove to accommodate an O-ring 4. In the installed condition, i.e., a threaded section 101 of the pressure measurement arrangement 10 is screwed into the connecting thread section 15, the O-ring 4 contacts the sealing section 14 of the housing 1 after passing the diagonal 141. In this embodiment of the seal, the pressing force of the O-ring 4 is definitively determined by the dimensions of the O-ring 4 and of the sealing section 14. Of course, the cord thickness, the hardness, etc. of the O-ring must be taken into account. It is essential that the pressing force in the present case not be dependent on the axial force which is generated by the screwing in of the threaded section 101 of the pressure measurement arrangement 10 into the connecting thread section 15.

Thus, on the one hand, the advantage can be obtained that the long-term leakproof quality of the connection of the pressure sensor with the pressure measurement arrangement 10 is improved since the flow of the material occurring in the threaded courses with the plastic materials used, in particular on the threads with low material thickness has no influence on the sealing force. The section of the housing 1 accepting the sealing force has a high material thickness so that, because of the low material load, flow hardly occurs here. As a result, the present radial seal has greater creep strength over time.

By means of the radial seal selected, the additional advantage can be obtained that the pressure measurement arrangement can be fastened non-rotatably with torsion protection 102 using bolts 9 in the threaded holes 18. By means of the radial seal, it is possible to screw the pressure measurement arrangement in sealingly without the exact angular position of the pressure measurement arrangement 10 being specified; i.e., no tightening of the screwed joints is necessary and, as a result, no tightening torque must be specified.

When the pressure measurement arrangement 10 is being screwed in, it can be rotated until the holes of the torsion protection 102 are opposite the threaded holes 18 in a desired measurement position of the pressure measurement device. Then, the bolts 9 are inserted and pressure measurement arrangement 10 is secured against unintended or unauthorized loosening. With corresponding length of the sealing section 14, i.e., greater than the course length or travel length of the thread in one revolution, the pressure measurement arrangement can be positioned at any measurement position in 360°, whereby the seal is nevertheless guaranteed.

What is claimed is:

1. Membrane pressure sensor with a hollow space formed between a housing (1) and a cover (2), which is subdivided by two membranes (6; 61, 62) parallel to each other into a pressure sensing space (24) for impingement with a fluid with a pressure to be measured, into an air evacuation space between the membranes (6; 61, 62), and into a measurement fluid filled pressure output space (13) to forward the pressure to a pressure measurement arrangement (10), characterized in that the membranes (6; 61, 62) are made of a perfluoroalkoxy copolymer (PFA) and are shaped congruently with the interposition of a flexible plastic fiber insert (63), that the membrane (61) on the pressure sensing side is in direct contact with the cover (2), and the membrane (62) on the fluid filling side is in direct contact with and sealed with an O-ring (5) which is compressed between the housing (1) and said membrane on the fluid filling side, that an O-ring (3) is provided and is radially compressed between the housing and the cover to seal the air evacuation space between the housing (1) and the cover (2), and that the housing (1) and cover (2) are made of a fluoropolymer.

2. Pressure sensor according to claim 1 for use with highly concentrated acids to which the pressure sensing space (24) is exposed, characterized in that the fluoropolymer for the housing (1) and the cover (2) is selected from the group: perfluoroalkoxy copolymer (PFA), polytetrafluoroethylene (PTFE), and polyvinylidene fluoride (PVDF).

3. Pressure sensor according to claim 1 for use with high-purity water in the pressure sensing space (24), characterized in that the fluoropolymer for the housing (1) and the cover (2) is selected from the group: perfluoroalkoxy copolymer (PFA), polytetrafluoroethylene (PTFE), and polyvinylidene fluoride (PVDF).

4. Pressure sensor according to claim 1 for use in the presence of bases for alkaline hydrolysis in the pressure sensing space (24), characterized in that the fluoropolymer for the housing (1) and the cover (2) is selected from the group: perfluoroalkoxy copolymer (PFA) and high-density high-grade polytetrafluoroethylene (PTFE).

5. Pressure sensor according to claim 1 for use in the presence of mineral acids or transition metal acids for acid catalytic polymerization in the pressure sensing space (24), characterized in that the fluoropolymer for the housing (1) and the cover (2) is selected from the group: perfluoroalkoxy copolymer (PFA) and high-density high-grade polytetrafluoroethylene (PTFE).

6. Pressure sensor according to claim 2, characterized in that the O-ring (3) between the housing and cover is made of vinylidene fluoride-hexafluoropropylene rubber (FKM) coated with tetrafluoroethylene-hexafluoropropylene copolymer (FEP).

7. Pressure sensor according to claim 3, characterized in that the O-ring (3) between the housing and cover is made of material which is selected from the group: vinylidene fluoride-hexafluoropropylene rubber (FKM) coated with tetrafluoroethylene-hexafluoropropylene copolymer (FEP), tetrafluoroethylene-perfluoromethylvinyl ether copolymer (TFE-PMVE), and polysilicone.

8. Pressure sensor according to claim 4, characterized in that the O-ring (3) between the housing and cover is made of material which is selected from the group: vinylidene fluoride-hexafluoropropylene rubber (FKM) coated with high-grade polytetrafluoroethylene (PTFE) and tetrafluoroethylene-perfluoromethylvinyl ether copolymer (TFE-PMVE).

9. Pressure sensor according to claim 5, characterized in that the O-ring (3) between the housing and cover is made of material which is selected from the group: vinylidene fluoride-hexafluoropropylene rubber (FKM) coated with high-grade polytetrafluoroethylene (PTFE), tetrafluoroethylene-perfluoromethylvinyl ether copolymer (TFE-PMVE), and polysilicone.

10. Pressure sensor according to claim 1, characterized in that the plastic fiber insert is made of polytetrafluoroethylene (PTFE).

11. Pressure sensor according to claim 1, characterized in that the housing (1) has a stepped hole passing through it, which has a threaded section (11) to mate with a thread (23) on the cover (2), a sealing section (12) for the O-ring (3), a pressure output chamber section (13), a passage to the pressure measurement arrangement (10) to be mounted thereon, a sealing section (14) for the pressure measurement arrangement (10), and an attachment section (15) for the pressure measurement arrangement (10).

12. Pressure sensor according to claim 1, characterized in that the air evacuation space between the membranes (61, 62) is connected to an air evacuation hole (17) in the housing (1), which is sealed liquid impermeably and gas permeably by an air evacuation plug (8) with a membrane (82) made of polytetrafluoroethylene (PTFE).

13. Pressure sensor according to claim 12, characterized in that the air evacuation space between the membranes (61, 62) is connected with a leakage hole (16) in the housing (1), in which a sensor (7) is inserted for detection of fluid to detect a rupture of the membranes (61, 62).

14. Pressure sensor according to claim 13, characterized in that the sensor (7) is a capacitive sensor.

15. Pressure sensor according to claim 11, characterized in that the sealing section (14) for the pressure measurement arrangement (10) is a cylindrical surface with a diagonal (141), which coordinates with a radially sealing O-ring (4) on the pressure measurement arrangement (10).

16. Pressure sensor according to claim 15, characterized by torsion protection (102) which mates with the pressure measurement arrangement (10) and is attached to the housing (1) by bolts (9).

17. Pressure sensor according to claim 1, characterized in that the pressure output space section (13) of the housing (1) is designed at least partially congruent with the surface shape of the membranes (6) turned toward it.

18. Pressure sensor according to claim 1, characterized in that the shape of the membranes is a sine-shaped concentric wave.

* * * * *